(No Model.)
N. T. WHITING.
GREASE TRAP.
No. 306,981. Patented Oct. 21, 1884.
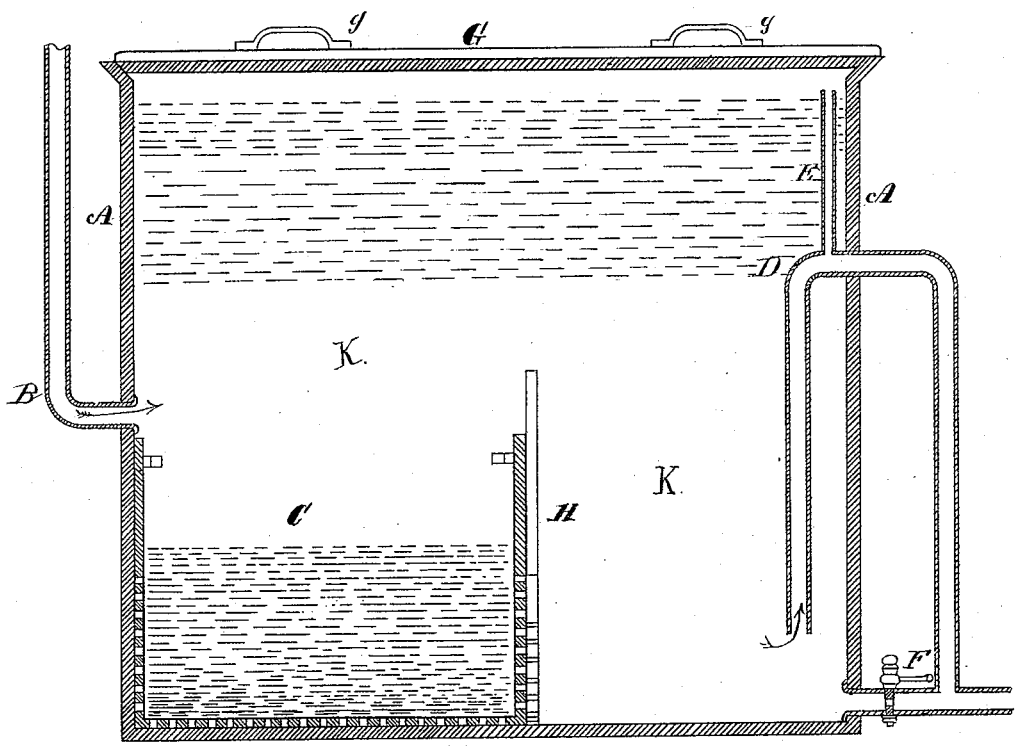
WITNESSES.
Arthur J. Weeks
C. D. Bowles
INVENTOR.
Nathaniel T. Whiting
per D. P. Kennedy
ATTORNEY.

UNITED STATES PATENT OFFICE.

NATHANIEL T. WHITING, OF SAN FRANCISCO, CALIFORNIA.

GREASE-TRAP.

SPECIFICATION forming part of Letters Patent No. 306,981, dated October 21, 1884.

Application filed September 27, 1883. (No model.)

*To all whom it may concern:*

Be it known that I, NATHANIEL T. WHITING, of the city of San Francisco, and county of San Francisco, and State of California, have invented an Improvement in Grease-Traps; and I hereby declare the following to be a full, clear, and exact description thereof.

My invention relates to a trap or apparatus which is to be applied to the discharge-pipes of sinks, &c., and which is especially designed to separate grease and sediment from the water and collect it in a body, so as to be otherwise disposed of, while allowing the water to escape without being loaded with substances which would tend to choke and clog the sewers.

It consists of a box or chamber having a perforated partition or partitions extending across its interior, and upwardly from the bottom, the inlet-pipe opening into the chamber at a point below the surface of the water, and a curved outlet-pipe extending from near the bottom of the chamber to any required height inside, thence through the side of the chamber and to the sewer or drain, and in connection with said outlet-pipe the air-vent to prevent siphonage, together with the discharge-pipe and stop-cock opening into a chamber close to the bottom, so that all the material may be drawn off when required.

Referring to the accompanying drawing for a more complete explanation of my invention, the figure is a vertical section taken through the apparatus, showing the interior.

A is a box or chamber formed of any suitable or desired size, with the top G, having handles by which it may be lifted when required.

B is the inlet-pipe communicating with the box or chamber A from the sink or other place where the water and material to be separated may be discharged.

D is the outlet-pipe mouth, which opens into the chamber at a point considerably lower than the mouth of the inlet-pipe. The pipe D then curves upward, passing out through the side of the box, and may be connected with the discharge sewer or drain. The upper curve or bend of the pipe D is situated at a point considerably above the level of the mouth of the inlet-pipe B, so that at all times there will be a body of water standing above the level of the pipe B and level with the lowest part of the curve of the discharge-pipe. Any grease or light substance which may be mixed with the water will therefore rise to the surface, where it may remain, usually hardening as the water becomes cool, and it can be removed by taking off the cover G at any time. The water will enter the mouth of the pipe D, which is near the bottom, and rise up over and through the curved portion, and will be discharged. In order to break any current which would be caused within the chamber A by the entrance of the water through the pipe B, I employ one or more partitions, H, which extend upwardly from the bottom of the chamber to a point at or about level with the mouth of the inlet-pipe B. The current of water entering from pipe B strikes against the partition and will be checked, so as to prevent any further agitation, while the grease will be deflected upward toward the surface. The partition or partitions H are perforated through the lower portion, so that the water may pass through freely, while any sediment which is too heavy to float will settle to the bottom within the chamber or chambers C formed by the partition.

F is a pipe opening directly and from the lower part of the chamber A into the discharge-pipe outside, and provided with stop-cock, which is usually closed, but which may be opened whenever it is desired to allow all the water within the chamber to escape.

The cover G may be fitted upon the top of the box by having beveled edges, which will make sufficiently tight joints, and may be secured by hooks, or otherwise. By this construction the water is checked and thrown upward as it enters into the chamber, the grease rising to the top and remaining there, while the water is allowed to flow freely over and through the perforated partitions H, the heavy sediment being collected in the sediment-chambers thus formed. As the pipe B enters below the surface of the water in the chamber, water stands at a certain height within this pipe, and thus forms an effective trap against any odors which might arise from the sewer-connection. As the pipe D is bent into a U-form, in order to prevent a tendency to siphon water out of the chamber A, I employ a small air pipe or tube, E, which extends upward from the upper curve of the pipe D, thus admitting air and preventing any pressure which would cause water to siphon out.

As the vent-pipe E extends upward and stops within the box or chamber A, it will be seen that in case of any stoppage occurring in the lower portion of the pipe D this pipe E would act as an overflow-pipe, and thus prevent the apparatus from filling up entirely and setting water back into the sink.

I make the partitions H as a part of the removable box which forms the sediment-chambers, so that when desired they may be removed at any time to discharge sediment which may have collected within them.

Having thus described my invention, what I claim as new, and desire to secure by Letters Patent, is—

A grease-trap consisting of a chamber having an inlet-pipe opening into it below the surface of the water, an outlet-pipe having its receiving end opening into the chamber at a point below the level of the inlet-pipe and curving upward, so that it discharges above the level of said pipe, a removable perforated sediment-chamber extending upwardly from the bottom of the main chamber, as shown, and a vent-pipe extending upwardly within the chamber from the discharge-pipe, as herein described.

NATHANIEL T. WHITING.

Witnesses:
C. D. BOWLES,
E. B. DUFUR.